United States Patent
Lam et al.

(10) Patent No.: US 9,787,083 B2
(45) Date of Patent: Oct. 10, 2017

(54) OVERHEAT-RESISTANT POWER CORD AND METHOD

(71) Applicant: Twin-Star International, Inc., Delray Beach, FL (US)

(72) Inventors: Fung U Lam, Hong Kong (HK); Yong Wu, Gaoqiao Town (CN); Matthew Crowe, Chelsea (CA)

(73) Assignee: Twin-Star International, Inc., Delray Beach, FL (US)

( * ) Notice: Subject to any disclaimer, the term of this patent is extended or adjusted under 35 U.S.C. 154(b) by 178 days.

(21) Appl. No.: 13/707,405

(22) Filed: Dec. 6, 2012

(65) Prior Publication Data

US 2014/0160611 A1 Jun. 12, 2014

(51) Int. Cl.
- *H02H 5/04* (2006.01)
- *H02H 7/22* (2006.01)
- *H01R 13/713* (2006.01)
- *H01R 24/30* (2011.01)

(52) U.S. Cl.
CPC ......... *H02H 5/047* (2013.01); *H01R 13/7137* (2013.01); *H02H 7/226* (2013.01); *H01R 24/30* (2013.01)

(58) Field of Classification Search
USPC ....................................................... 361/93.8
See application file for complete search history.

(56) References Cited

U.S. PATENT DOCUMENTS

| | | | |
|---|---|---|---|
| 4,310,837 A | 1/1982 | Kornrumpf et al. | |
| 4,389,694 A | 6/1983 | Cornwell, Jr. | |
| 4,470,711 A | 9/1984 | Brzozowski | |
| 4,707,686 A | 11/1987 | Greenhalgh | |
| 5,003,486 A | 3/1991 | Hendel et al. | |
| 5,188,542 A | 2/1993 | Ballman | |
| 5,250,892 A | 10/1993 | Yang | |
| 5,424,895 A | 6/1995 | Gaston | |
| 5,633,775 A | 5/1997 | Scarelli | |
| 5,833,489 A | 11/1998 | Kim | |
| 5,841,617 A | 11/1998 | Watkins, Jr. et al. | |
| 5,844,759 A * | 12/1998 | Hirsh et al. | 361/42 |
| 5,946,180 A | 8/1999 | Simpson | |
| 5,995,350 A | 11/1999 | Kopelman | |

(Continued)

FOREIGN PATENT DOCUMENTS

| | | |
|---|---|---|
| CA | 2240119 | 12/1998 |
| CN | 1134092 | 1/2001 |

(Continued)

*Primary Examiner* — Ronald W Leja (74) *Attorney, Agent, or Firm* — McDonald Hopkins, LLC (57) ABSTRACT

An overheat-protection device with a cord that includes a transmission wire to transmit electrical power and a sensor wire to transmit a signal, a plug attached to an end of the cord, and a thermistor includable in the plug and connected to the sensor wire. The signal may be received and/or analyzed by a sensing device, which may control a switching device to open and/or close a power circuit. The thermistor may detect a level of heat, which may be communicated as a signal via the sensor wires. The signal may be definable by the thermistor varying a level of resistance to the signal responsive to the level of detected heat. The thermistor may be a NTC thermistor and may be constructed from a thermal plastic or a ceramic.

20 Claims, 9 Drawing Sheets

(56) References Cited

U.S. PATENT DOCUMENTS

| | | |
|---|---|---|
| 6,801,117 B2 | 10/2004 | Morris, Jr. et al. |
| 6,893,153 B2 | 5/2005 | Hoffer et al. |
| 7,420,792 B2 | 9/2008 | Zhang |
| 7,737,704 B2 | 6/2010 | Diab et al. |
| 7,801,648 B2 | 9/2010 | Kim |
| 7,944,667 B2 | 5/2011 | Ouwerkerk |
| 8,248,260 B1* | 8/2012 | Pope ................ H01B 7/32 340/650 |
| 8,325,454 B2 | 12/2012 | Brugner et al. |
| 8,339,760 B2 | 12/2012 | Rabu et al. |
| 8,405,946 B2 | 3/2013 | Higuchi et al. |
| 8,432,657 B2 | 4/2013 | Nakamura |
| 8,498,087 B2 | 7/2013 | Rabu et al. |
| 8,605,402 B2 | 12/2013 | Ward et al. |
| 8,693,156 B2 | 4/2014 | Nakamura et al. |
| 8,740,456 B2 | 6/2014 | Monks et al. |
| 2002/0121983 A1 | 9/2002 | Boyden |
| 2004/0169969 A1 | 9/2004 | Takeda |
| 2005/0109752 A1* | 5/2005 | Merk et al. ............ 219/212 |
| 2008/0056331 A1* | 3/2008 | Matias et al. ........... 374/185 |
| 2008/0057780 A1* | 3/2008 | O'Rourke .............. 439/505 |
| 2008/0080592 A1* | 4/2008 | Houben et al. .......... 374/185 |
| 2009/0195237 A1* | 8/2009 | Feliss ............ B60L 3/0069 323/318 |
| 2010/0029140 A1* | 2/2010 | O'Rourke .............. 439/668 |
| 2011/0134575 A1* | 6/2011 | Ward et al. ............. 361/42 |
| 2012/0287546 A1* | 11/2012 | Kopelman ............. 361/105 |
| 2013/0077222 A1* | 3/2013 | Sleven ................ 361/679.4 |
| 2013/0342352 A1 | 12/2013 | Knoop |
| 2014/0045366 A1* | 2/2014 | O'Rourke ............. 439/488 |

FOREIGN PATENT DOCUMENTS

| | | |
|---|---|---|
| CN | 201590647 | 9/2010 |
| DE | 1942110 | 3/1910 |
| DE | 3900606 | 7/1990 |
| DE | 19602631 | 2/1997 |
| FR | 2880728 | 7/2006 |
| GB | 1280732 | 7/1972 |
| GB | 9417376 | 10/1994 |
| GB | 200018068 | 9/2000 |
| GB | 2388977 | 11/2003 |
| GB | 200701687 | 3/2007 |
| GB | 200917515 | 11/2009 |
| JP | 1298917 | 12/1989 |
| JP | 10326646 | 12/1998 |
| JP | 2008154305 | 7/2008 |
| JP | 2011014516 | 1/2011 |
| JP | 2012149059 | 8/2013 |
| KR | 20030096543 | 12/2003 |
| NL | 7506090 | 11/1976 |
| RU | 127537 | 4/2013 |
| TW | 200937788 | 9/2009 |
| TW | 201136081 | 10/2011 |
| WO | 03000324 | 1/2003 |
| WO | 2006109330 | 10/2006 |

* cited by examiner

OVERHEAT-RESISTANT POWER CORD AND METHOD

FIELD OF THE INVENTION

The invention relates to power transmission. More particularly, the invention relates to a detection and switching device to minimize overheating from power transmission.

BACKGROUND

In our modern society, many devices and appliances we interface with everyday consume electrical power. The electrical power that drives these devices is typically received via a power cord. One end of the power cord may include a plug, which may interface with an electrical socket to draw power from the power grid. The other end of the electrical cord may be connected to the electrical device or appliance, which draws its power through the cord.

In the United States, most electrical outlets operate between 110-120 volts of alternating current. Power infrastructures in other countries, and with high load or industrial applications within the United States, higher voltages may be used. At any voltage set by the grid, increasing power needs require a power be drawn through at higher currents. This current is typically drawn through a power cord.

The amount of power necessary to operate an electrical device may vary greatly with the type of device being powered. Correspondingly, the amount of power drawn through the power cord may vary as well. Typically, power cords are designed to safely transmit an electrical current that can accommodate its expected usage scenario. However, the efficiency of power cord or their connected appliances may deteriorate, or the cord may be misused, resulting in a higher current being drawn through the power cable than its capacity may allow. Passing too much current though a power cord can cause the cord and/or plug to heat. If the cord heats too much, it may overheat and a fire may result.

Circuit breakers and fuses can help prevent drawing too much current through a household electrical system. However, circuit breaker and fuses provide little protection for power cord connected to individual devices or appliances. Surge protectors may be placed in the circuit between the power source and the electrical device or appliance. However, surge protectors typically only protect against unexpected surges from the grid and not a persistent overdraw of current through a cord. Additionally, surge protectors invite users to plug numerous electrical devices into one outlet, drawn through the cord of the surge protector, often creating the dangerous situation of overheating by drawing too much current.

What is needed is a power cord that can sense conditions indicative of overheating or drawing too much current. What is also needed is a power cord that can provide feedback as to when a power cable is likely to be overheating. Furthermore, what is needed is an device to detect the signal that is indicative of a cord overheating and open a respective circuit accordingly.

SUMMARY

According to embodiments of the present invention, an overheat-resistant power cord is described that may sense conditions indicative of overheating or drawing too much current. The overheat-resistant power cord may provide feedback as to when a power cable is likely to be overheating. Furthermore, the overheat-resistant power cord may be used to detect the signal that is indicative of a cord overheating and open a respective circuit accordingly.

Accordingly, the invention features an overheat-protection device that may include a cord, plug, thermistor, and a switching device. The cord may include transmission wires to transmit electrical power and at least two sensor wires to transmit a signal. The plug may be attached to an end of the cord, at least two prongs being includable in the plug to interface with an electrical power source. The thermistor may be included in the plug and connected to the at least two sensor wires to vary the signal carried by the at least two sensor wires. The switching device may be used to open or close a power circuit respective to the signal carried by the at least two sensor wires. The switching device may be controlled by a sensing device.

In one aspect, the thermistor may vary the signal respective to a level of detected heat.

In one aspect, the thermistor may vary the signal by varying a level of resistance of the thermistor respective to the level of detected heat.

In another aspect, the switching device may open the power circuit upon detecting the signal is varied to have a lower resistance than a threshold resistance and may close the power circuit upon detecting the signal is varied to have a higher resistance than the threshold resistance.

In one aspect, the thermistor may be a negative temperature coefficient (NTC) thermistor. The thermistor may be constructed from a thermal plastic or a ceramic.

In one aspect, the switching device may include a relay or a triac. The switching device may be included in an appliance connected to the cord at an opposite end of the cord to the plug.

The invention can also feature an overheat-protection device that includes a cord, plug, sensor, and switching device. The cord may include transmission wires to transmit electrical power and at least two sensor wires to transmit a signal. The plug may be attached to an end of the cord, at least two prongs being includable in the plug to interface with an electrical power source. The sensor may be included in the plug and connected to the at least two sensor wires to vary the signal carried by the at least two sensor wires respective to a level of detected heat. The switching device may open or close a power circuit respective to the signal carried by the at least two sensor wires. The switching device may be controlled by a sensing device. The switching device may include a relay or triac.

In one aspect, the sensor may be a thermistor. The thermistor may vary the signal by varying a level of resistance of the thermistor respective to the level of detected heat. The thermistor may be a negative temperature coefficient (NTC) thermistor. The thermistor may be constructed from a thermal plastic or a ceramic.

In one aspect, the switching device may open the power circuit upon detecting the signal is varied to have a lower resistance than a threshold resistance or close the power circuit upon detecting the signal is varied to have a higher resistance than the threshold resistance.

In one aspect, the switching device may be included in an appliance connected to the cord at an opposite end of the cord to the plug.

A method of the invention can be used to protect a power cord from overheating using an overheat-protection device. The overheat-protection device may include a cord with transmission wires to transmit electrical power and at least two sensor wires to transmit a signal, a plug attached to an end of the cord, at least two prongs being includable in the plug to interface with an electrical power source, a thermistor included in the plug and connected to the at least two sensor wires, and a switching device.

The method may include the step of detecting a level of heat using the thermistor, the level of heat being communicable as the signal. The method may also include the step of transmitting the signal via the at least two sensor wires. Additionally, the method may include the step of controlling the power circuit using the switching device to open or close the power circuit respective to the signal carried by the at least two sensing wires. The switching device may be controlled by a sensing device. The signal may be defined by the thermistor varying a level of resistance to the signal respective to the level of detected heat.

Another method of the invention may further include the step of opening the power circuit upon detecting the signal is varied to have a lower resistance than a threshold resistance and closing the power circuit upon detecting the signal is varied to have a higher resistance than the threshold resistance.

Another method of the invention can include the thermistor being a negative temperature coefficient (NTC) thermistor. Additionally, the thermistor may be constructed from a thermal plastic or a ceramic.

Another method of the invention can feature the switching device including a relay or a triac. The switching device may be included in an appliance connected to the cord at an opposite end of the cord to the plug.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings. In the following description, an overheat-resistant power cord will be discussed. Those of skill in the art will appreciate alternative labeling of the overheat-resistant power cord as a power cord, cord, device, apparatus, the invention, or other similar names. Skilled readers should not view the inclusion of any alternative labels as limiting in any way.

Figure 1:
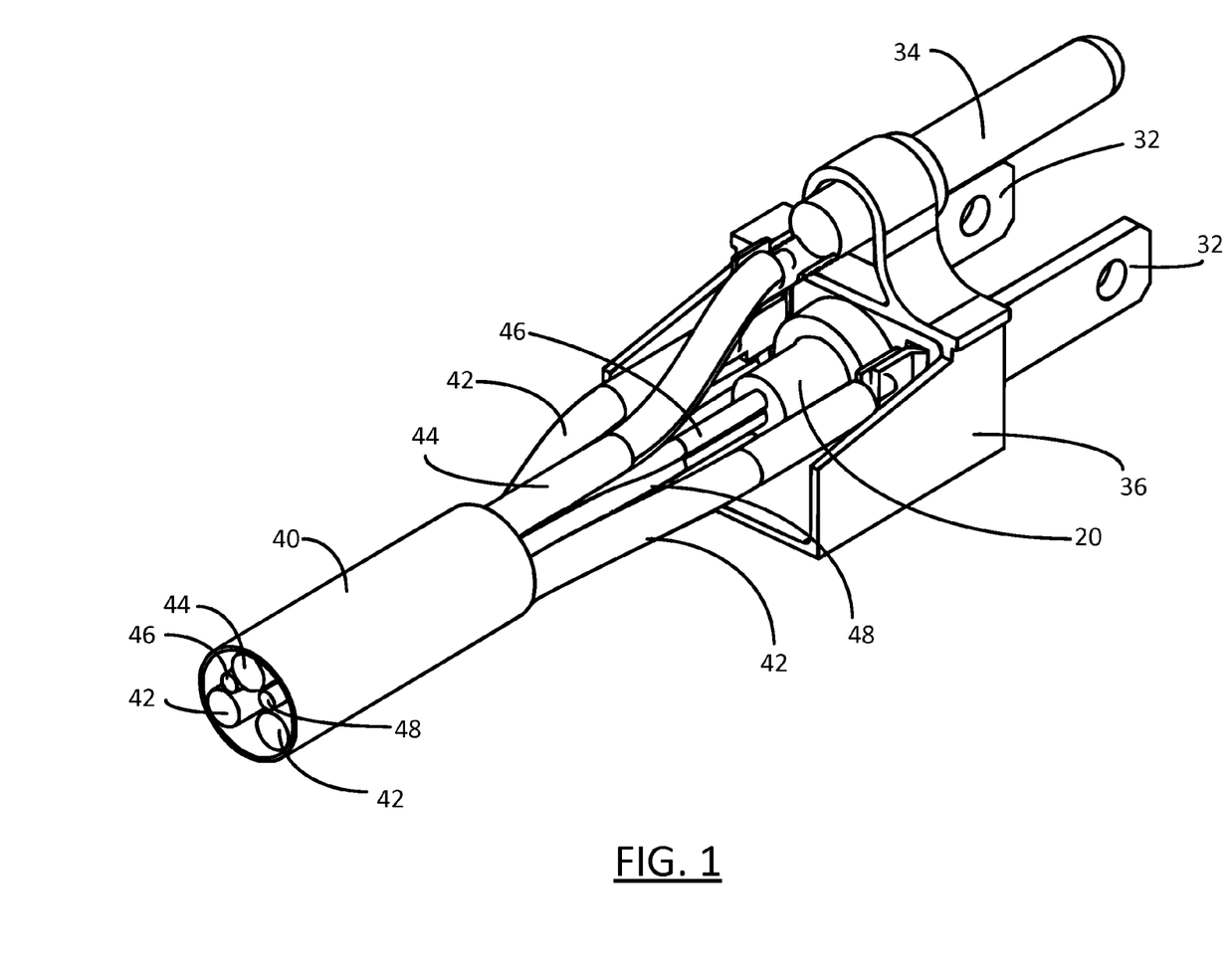
FIG. 1 is a perspective view of the cord and plug, showing the internals of the plug, according to an embodiment of the present invention.
Figure 2:
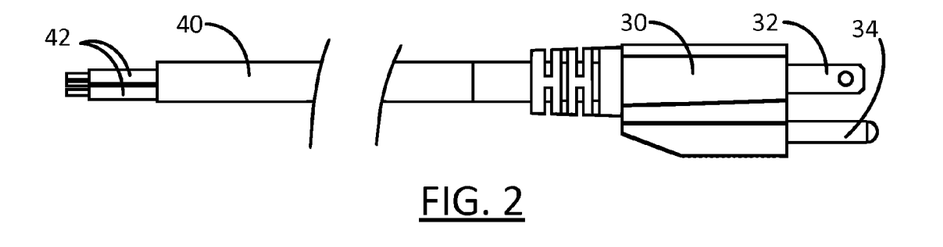
FIG. 2 is a side elevation view of the cord and plug, according to an embodiment of the present invention.
Figure 3:
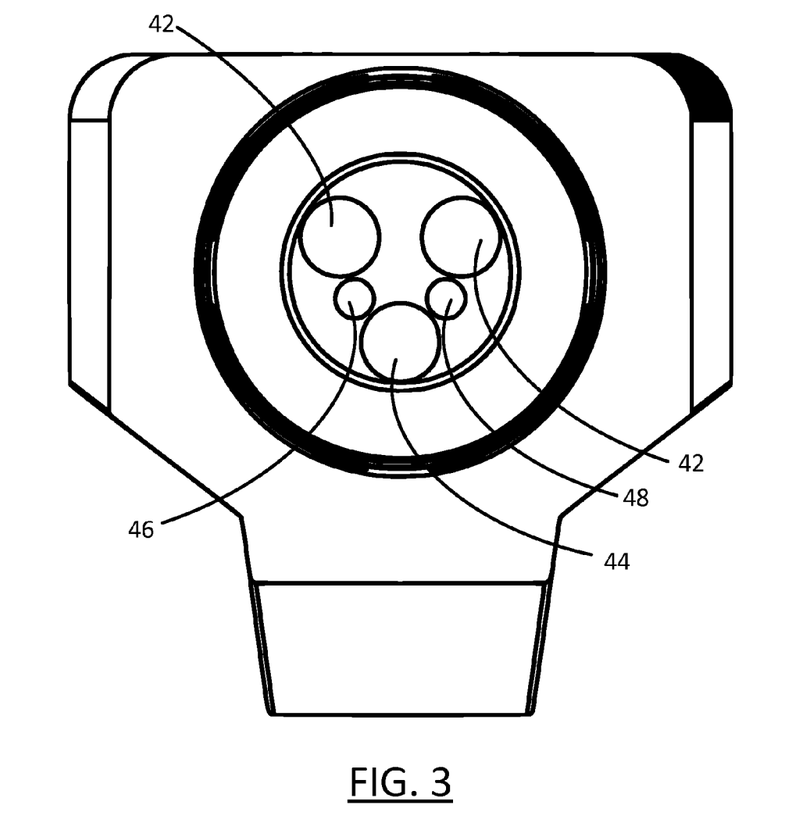
FIG. 3 a rear elevation view of the cord entering the plug, according to an embodiment of the present invention.
Figure 4:
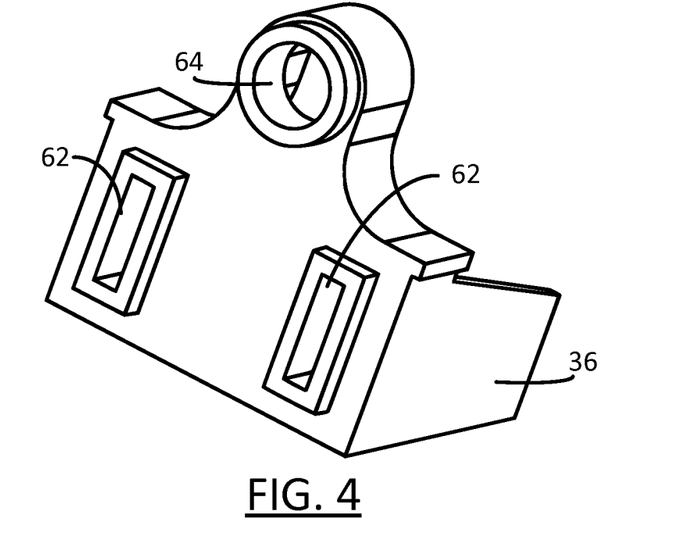
FIG. 4 is a perspective view of a bracket, according to an embodiment of the present invention.
Figure 5:
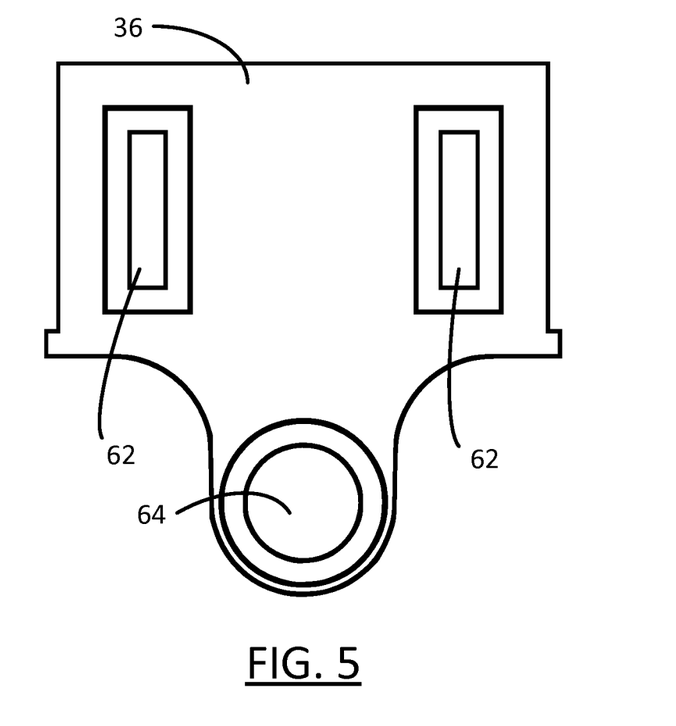
FIG. 5 is a front elevation view of the bracket of FIG. 4
Figure 6:
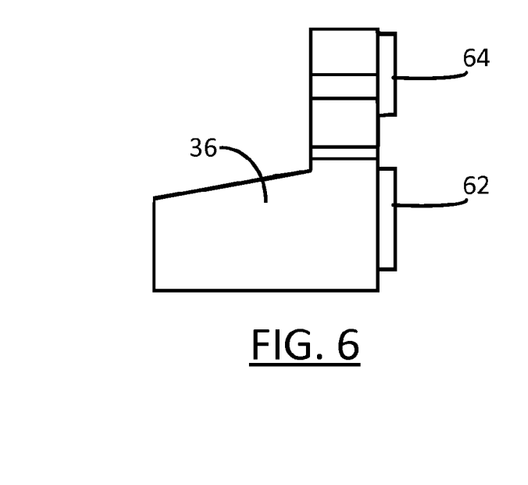
FIG. 6 is a side elevation view of a bracket, according to an embodiment of the present invention.
Figure 7:
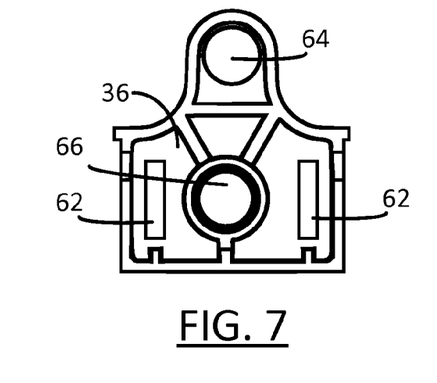
FIG. 7 is a rear elevation view of the bracket of FIG. 6.
Figure 8:
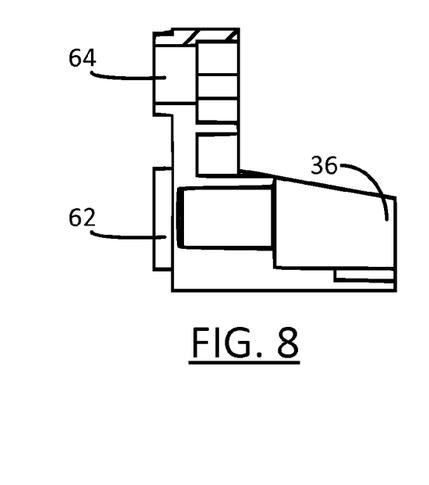
FIG. 8 is a side elevation view of the bracket of FIG. 6
Figure 9:
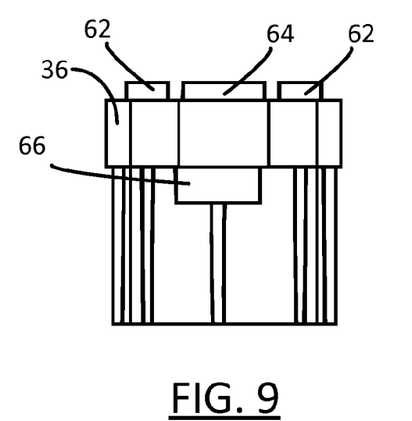
FIG. 9 is a top plan view of the bracket of FIG. 6.
Figure 10:
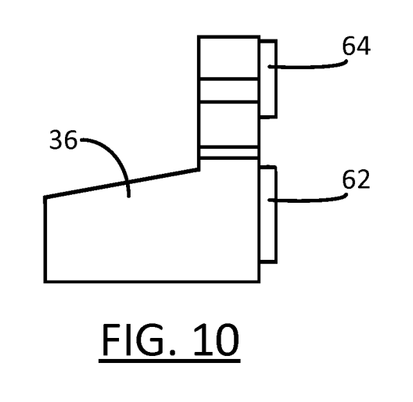
FIG. 10 is a side elevation view of a bracket, according to an embodiment of the present invention.
Figure 11:
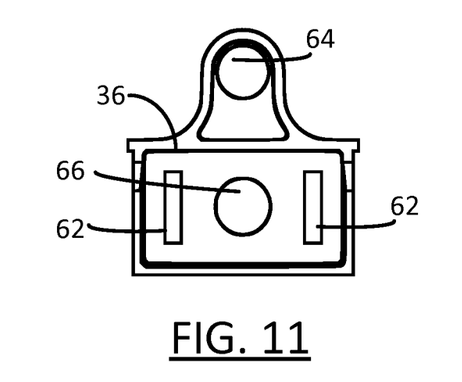
FIG. 11 is a rear elevation view of the bracket of FIG. 10.
Figure 12:
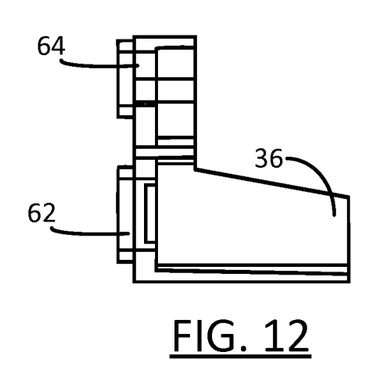
FIG. 12 is a side elevation view of the bracket of FIG. 10.
Figure 13:
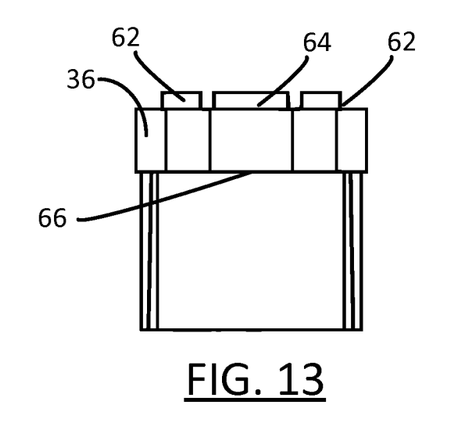
FIG. 13 is a top plan view of the bracket of FIG. 10.
Figure 14:
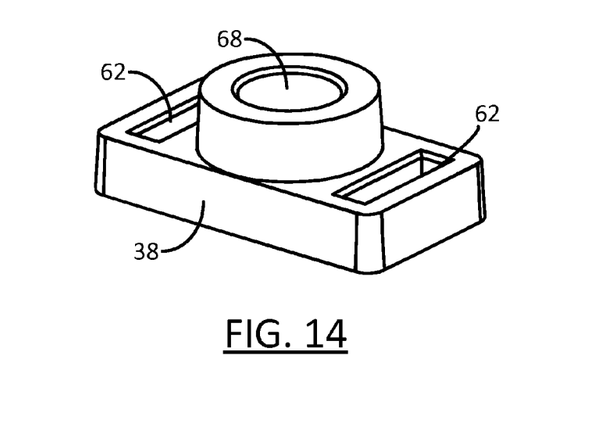
FIG. 14 is a perspective view of a brace, according to an embodiment of the present invention.
Figure 15:
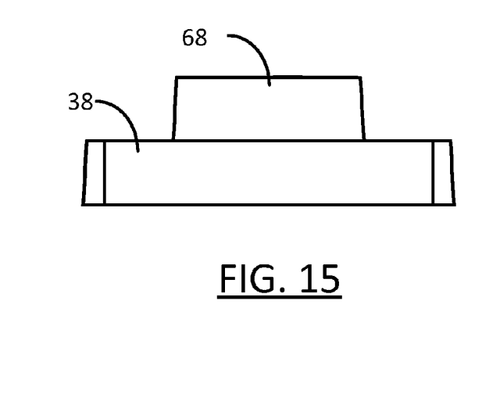
FIG. 15 is a side elevation view of the brace of FIG. 14.
Figure 16:
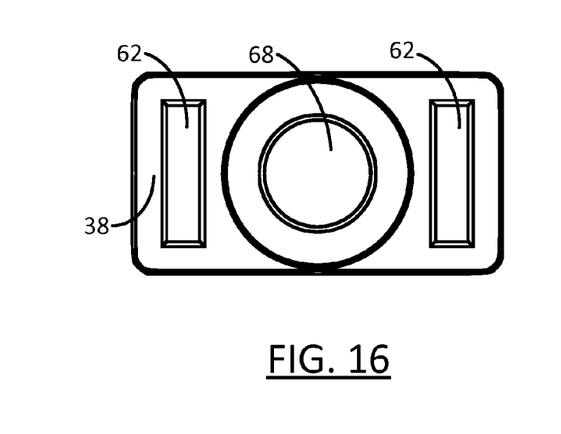
FIG. 16 is a top plan view of the brace of FIG. 14.
Figure 17:
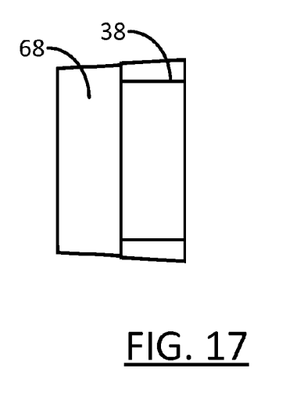
FIG. 17 is a side elevation view of the brace of FIG. 14.

Referring now to FIGS. 1-3, the device of the present invention will be discussed generally. The device may include a cord 40, plug 30, transmission wires 42, sensor wires, a thermistor 20 or other sensor, and a switching device. The cord 40 may include the transmission wires 42 and the sensor wires 46, 48. The cord 40 may also include a ground wire 44. The transmission wires 42 may connect to prongs 32, which may be included by the plug 30. A ground prong 44 may also be included by the plug 30. Also, the signal wires may connect to a thermistor 20 or other sensor, which may also be included by the plug 30. The cord 40 may be connected to an electrical device or appliance, generally referred to as an "appliance" without limitation, at the end of the cord 40 opposite to the plug 30. Those of skill in the art will appreciate that the cord 40 may have multiple ends, and each end that is not attached to a plug 30 should be considered opposite to the plug 30 for the purpose of this disclosure. The switching device may be included by the appliance, which may open or close an electrical circuit respective to a signal received via a sensor wire. Alternatively, the switching device may be included in the plug 30 or cord 40.

The plug 30 will now be discussed in greater detail. The plug 30 may include multiple components and connections that allow electrical power to be received from a power source and transmitted through the cord 40. Skilled artisans will appreciate that power may be transmitted in either direction through the cord 40, and should not view any examples of power being drawn from the plug 30, through the cord 40, and to an appliance, as limiting in any way. The plug 30 may be inserted into an electrical outlet, from which it may draw power to be transmitted via the attached cord 40.

The plug 30 may include prongs 32. The prongs 32 may be elongated members that are capable of being inserted into an electric receptacle, closing an electrical circuit and allowing the transmission of electrical power. A ground prong 34 may also be included, which may allow an overflow of current to be transmitted to a grounded circuit, such as an earth ground. Skilled artisans understand and appreciate the composition of prongs 32 and ground prongs 34 in an electrical plug 30.

Transmission wires 42 may be operatively connected to the prongs 32 to allow electricity to pass from the prongs 32 to the transmission wire 42. Skilled artisans will appreciate that any number of transmission wires 42 may be used and will not view the illustration of two transmission wires 42 to limit the present invention in any way. Similarly to the transmission wires 42, one or more ground wire 44 may be connected to the ground prong 34. Inclusion of ground wires 44 and the ground prong 34 may be optional.

A sensor, such as a thermistor 20, may be included in the plug 30. Reference to use of a thermistor 20 as the sensor throughout this disclosure should not be viewed to limit the scope of the sensor, or the present invention, in any way. A thermistor 20 is an electronic component that possesses resistance characteristics that vary with respect to changes in its body temperature. Operation of a thermistor 20 will be discussed in greater detail below. One or more sensor wires may be connected to the thermistor 20. In the embodiment illustrated in FIGS. 1 and 3, two sensor wires are included in the device. Skilled artisans will appreciate that sensory of a condition, such as temperature, can be performed with more or less sensor wires, and should not view the present invention to be limited to two-sensor-wire systems.

The prongs 32, thermistor 20, and other components of the plug 30 may be connected to and/or supported by a bracket 36, embodiments of which are perhaps best illustrated additionally in FIGS. 4-13. The bracket 36 may then be covered by an insulating shield to form the plug 30. Additionally, a brace 38 may be included to position or maintain a location of the thermistor 20 within the plug 30. The bracket 36 will now be discussed in greater detail.

The bracket 36 may include a number of prong slots 62, through which the prongs 32 may be passed. The prong slots 62 may be shaped to accommodate and receive the prongs 32. The bracket 36 may also include a ground prong slot 64. The ground prong slot 64 may be shaped to accommodate and receive the ground prong 34. Skilled artisans will appreciate additional slots that may be included in the bracket 36 consistent with this disclosure.

The bracket 36 may also include a thermistor dock 66. The thermistor dock 66 may be substantially opened on one end, but closed from exposure through the face of the bracket 36 at the opposite end. The thermistor dock 66 may be shaped to receive a thermistor 20. Optionally, the thermistor dock 66 may be shaped to snugly receive the thermistor 20, at least partially securing the thermistor 20 in place. However, the thermistor 20 may be additionally secured by adhesives, fixtures, or a brace 38. The brace 38 will be discussed in greater detail below.

The bracket 36 may be configured to receive various types of thermistors 20 and/or other sensors. For example, FIGS. 6-9 illustrate a bracket 36 configured to receive a thermistor 20 formed of heat conductive plastics. As another example, FIGS. 10-13 illustrate a bracket 36 configured to receive a thermistor 20 formed of ceramics. Skilled artisans will appreciate additional brackets 36 that may be adapted to receive additional sensors, which may include thermistors 20 with a combination of the aforementioned and/or alternative compositions, or other types of sensors.

Referring now to FIGS. 14-17, the brace 38 will now be discussed in greater detail. Similar to the bracket 36, the brace 38 may include one or more prong slot 62, through which prongs 32 may be passed. The brace 38 may also include a thermistor slot 68, through which a thermistor 20 may be passed and/or secured. Optionally, the brace 38 may include a ground prong slot 64, through which a ground prong 34 may be passed.

The brace 38 may work in concert with the bracket 36 to help secure one or more components of the plug 30. For example, and without limitation, the brace 38 may be placed behind the inner face of the bracket 36. The thermistor 20 may be passed through the thermistor slot 68 of the brace 38, such that it may be received by the thermistor dock 66 of the bracket 36. Additionally, the prongs 32 may be passed through the prong slots 62 of the brace 38 and the prong slots 62 of the bracket 36, helping to keep the thermistor 20 spaced at a desired distance between the prongs 32. Skilled artisans will appreciate additional configurations by which the brace 38 may be included in the plug 30 that would be apparent after having the benefit of this disclosure. Optionally, the brace 38 may be secured by adhesives, fixtures, or other securing techniques.

Referring back to FIGS. 1-3, the cord 40 will now be discussed in greater detail. The cord 40 may include transmission wires 42, sensor wires 46, 48, and optionally ground wires 44. The cord 40 may also include insulation, shielding, and other elements typical to an electrical power cord 40, as will be appreciated by those of skill in the art. In additional embodiments, the cord 40 may also include other types of wires that would be apparent to skilled artisans. An insulator or other material may enclose the transmission wires 42, sensor wires, and optionally ground wires 44 carried by the cord 40. In an embodiment, the insulating material may approximately uniformly encircle and enclose the wires carried by the cord 40.

The transmission wires 42 may carry electrical power from the plug 30 to the appliance. The transmission wires 42 may be configured with a width or gauge adequate to carry an electrical current required to drive the connected appliance. The sensor wires may carry a signal, which may be used or analyzed to reflect a condition in the cord 40. The sensor wires may connect to the appliance, which may include a sensing device and/or switching device, at a first end of the cord 40. The sensor wires may also connect to the thermistor 20, which may be located in the plug 30 at the opposite end of the cord 40. The thermistor 20 may vary the signal transmitted by the sensor wires. The signal may be used to directly or indirectly open or close a circuit. The operation by which the circuit may be controlled will be discussed in greater detail below.

In an embodiment of the present invention, at least two sensor wires are included in the cord 40, a first sensor wire 46 and a second sensor wire 48. The signal may pass from the appliance or sensing device to the thermistor 20 via the first sensor wire 46. The thermistor 20 may then vary the signal received from the first sensor wire 46. The signal may then pass from the thermistor 20 back to the appliance via the second sensor wire 48. Skilled artisans should not view this two-sensor-wire embodiment to limit the present invention in any way.

The sensor will now be discussed in greater detail. In the following example, the sensor will be discussed as being a thermistor. Skilled artisans will appreciate additional sensors that may be included in the cord 40 and/or plug 30 to detect a condition and vary a signal accordingly. The condition may be, but should not be limited to, change in temperature or heat. Accordingly, the following example should not be read to limit the present invention.

A thermistor 20 is a component used in electrical circuits that vary resistance in relation to change in temperature. The general workings of a thermistor should be appreciated by those with skill in the art. The resistance variation of a thermistor is typically higher than with standard resistors. Thermistors are typically created using a ceramic and/or polymer, such as a high thermal plastic. Thermistors may also be created using semiconductor materials.

Oxides may be added to the thermistor material, which may be combined as a powder with a binding compound. Examples of oxides that may be used in creating a thermistor include, but should not be limited to, manganese, cobalt, nickel, iron, copper, titanium, a combination of multiple oxides, or other similar materials. Other thermistors may include compositions of barium titanate, lead, strontium titanates, yttrium, manganese, and/or silica. The quantity and configuration of these materials may determine the thermal and resistive characteristics of the thermistor.

Depending on the materials used to create the thermistor 20, it may operate with a positive temperature coefficient (PTC) or negative temperature coefficient (NTC). In a PTC thermistor, resistance increases with respect to an increase in temperature. Generally, thermistors that include compositions of barium titanate, lead, strontium titanate, yttrium, manganese, and/or silica have positive temperature coefficients. Conversely, in a NTC thermistor, resistance decreases with respect to an increase in temperature. Generally, thermistors that include metal oxides of manganese, nickel, cobalt, copper, and/or iron have a negative temperature coefficient. In applications other than small temperature changes, the rate of increase and decrease of resistance compared to change in temperature is often non-linear.

Sensing temperature using a thermistor 20 will now be discussed. More specifically, sensing temperature using a NTC thermistor 20 will now be discussed. As discussed above, the resistive characteristics of a NTC thermistor 20 vary indirectly with its temperature. For example, as the temperature of a NTC thermistor 20 may increase, the resistive properties of the thermistor 20 may decrease. This decrease in resistance may allow an electrical signal to pass through the thermistor 20 without being substantially varied by resistance from the thermistor 20. Wires may be connected to the thermistor 20, such as sensor wires, to conduct an electrical signal to and from the thermistor 20. Typically, the resistance of the sensor wires will be low, and thus may have a negligible impact on the resistance applied to the sensory signal compared to the thermistor 20.

The sensor wires connected to the thermistor 20 may also be connected to a sensing device at their opposite ends. The sensing device may detect a level of resistance applied to an electrical signal. The electrical signal may be a voltage, such as a direct current (DC) voltage. Additionally, the electrical signal may include a waveform and/or data transmission. The sensing device may detect the signal, and a resistance applied to the same, from one or more of the sensor wires. Upon detecting the signal, the sensing device may analyze the signal to determine the temperature of the device, as detected by the thermistor 20. As a specific example, provided without limitation, the sensing device may determine the change in temperature at the plug 30, which has been detected by a NTC thermistor 20 in the plug 30, by detecting a drop in resistance to the electrical signal carried by the sensor wires.

The sensing device and/or the switching device may be configured to open or close the power circuit, or the circuit through which power is transmitted to from the plug 30 to the appliance via the transmission wires 42, according to the signal detected by the sensor wires. The sensing device may actively or passively control the circuit. For example, in an active system, programmable logic may be implemented by the sensing device to define voltage or signal thresholds at which the device should open or close the circuit. Alternatively, passive systems may include components that are engaged upon a condition being met, such as a voltage threshold, which may be defined by a threshold resistance.

As discussed above, the power circuit may be opened or closed in response to the signal detected from the sensor wires. The power circuit might use an electrically operated switching device, such as a relay or triac. For example, a relay may be used to control the power circuit by receiving a low-power signal and opening or closing the power circuit responsive to the characteristic of the low-power signal. A skilled artisan will understand and appreciate the structure and operation of a relay. In passive systems, the low-power signal may be received directly from the signal wire and/or an analog circuit connected to the signal wire. In active systems, the low-power signal used to active the switching device may be generated by digital logic connected to the signal wire.

The sensing device may be included in an appliance, which may be connected at least in part to the cord 40. Alternatively, the sensing device may be included in the plug 30 or within the cord 40. Skilled artisans will appreciate a plethora of locations at which the sensory device may be located while maintaining the ability to detect a level of resistance across sensor wires and affect an electrical power circuit.

Figure 18:
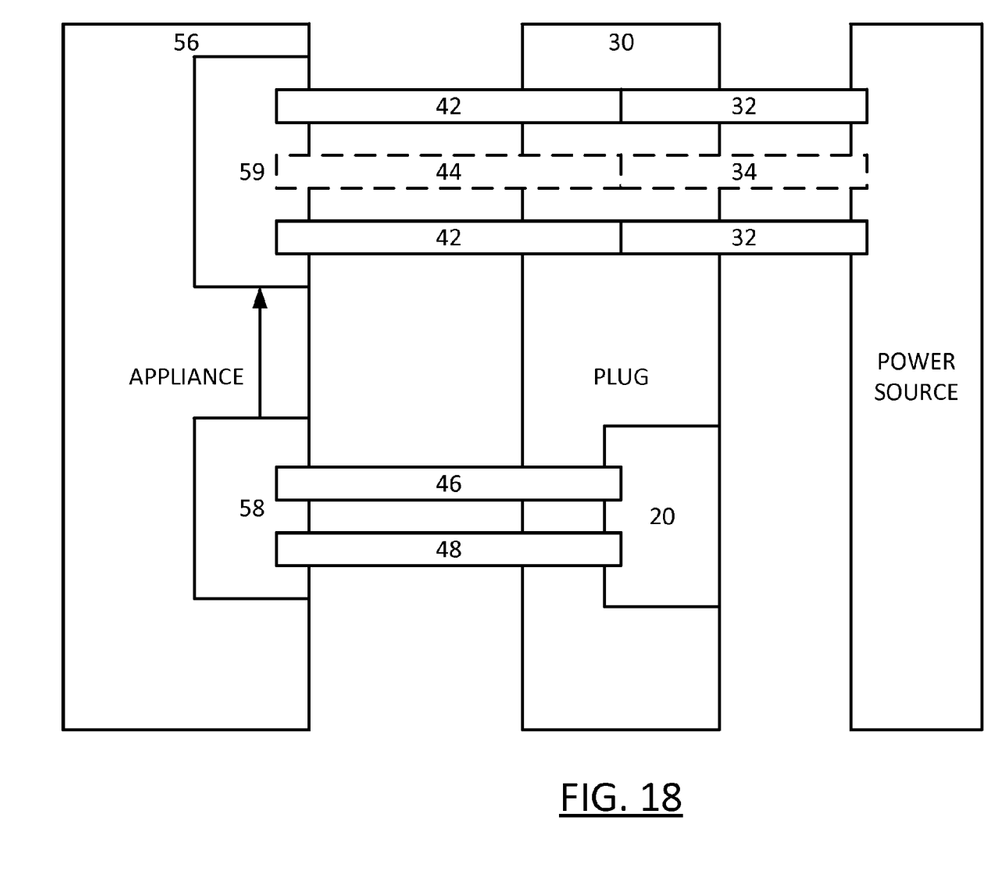
FIG. 18 is a block diagram illustrating a connective structure of the device, according to an embodiment of the present invention.

Referring now to block diagram 50 of FIG. 18, an illustrative embodiment of the present invention will now be discussed. Skilled artisans should appreciate that the embodiment discussed along with block diagram 50 is provided as an example without limitation, and is discussed in the interest of clearly describing one configuration of the system. Block diagram 50 illustrates a power source 54, which may supply power to a connected device or appliance 56. The power source 54 may be, for example, a common electrical outlet. The plug 30 may interface with the power source 54. As illustrated in block diagram 50, two prongs 32 may be used to connect the plug 30 to the power source 54. Optionally, a ground prong 34 may also connect between the plug 30 and the power source 54.

In the plug 30, the prongs 32 may be connected to the transmission wires 42. In configurations that include a ground wire 44 and/or ground prong 34, a connection between the two may also be made in the plug 30. Additionally, the plug 30 may include a thermistor 20. A number of sensor wires may be connected to the thermistor 20 in the plug 30. In the example illustrated by block diagram 50, two sensor wires are connected to the thermistor 20 in the plug 30. These two sensor wires include a first sensor wire 46 and a second sensor wire 48.

The transmission wires 42, sensor wires 46, 48, and optional ground wire 44 may be carried together in the cord 40 to an appliance 56. Skilled artisans will appreciate that one or more of the wires may be carried in separate, collective, or otherwise configured cords 40. As such, the present invention should not be limited to embodiments that only include one cord 40. Similarly, the present invention should not be limited to embodiments with cords 40 having only one plug 30 and one appliance 56.

The cord 40, and the wires carried by the cord 40, may be connected to an appliance 56. The sensor wires 46, 48 may be connected to a sensing device 58, which may be included in the appliance 56. Also, the transmission wires 42 may be connected to a switching device 59. If included, the ground wire 44 may also be connected to the switching device 59 or directly to the appliance 56. The sensing device 58 may also be connected to the switching device 59, allowing the sensing device 58 to control the switching device 59. As discussed above, in some embodiments, the sensor wires may be connected to the switching device 59 directly. From the switching device 59, the transmission wires 42 may be connected to deliver electrical power to the appliance 56.

Figure 19:
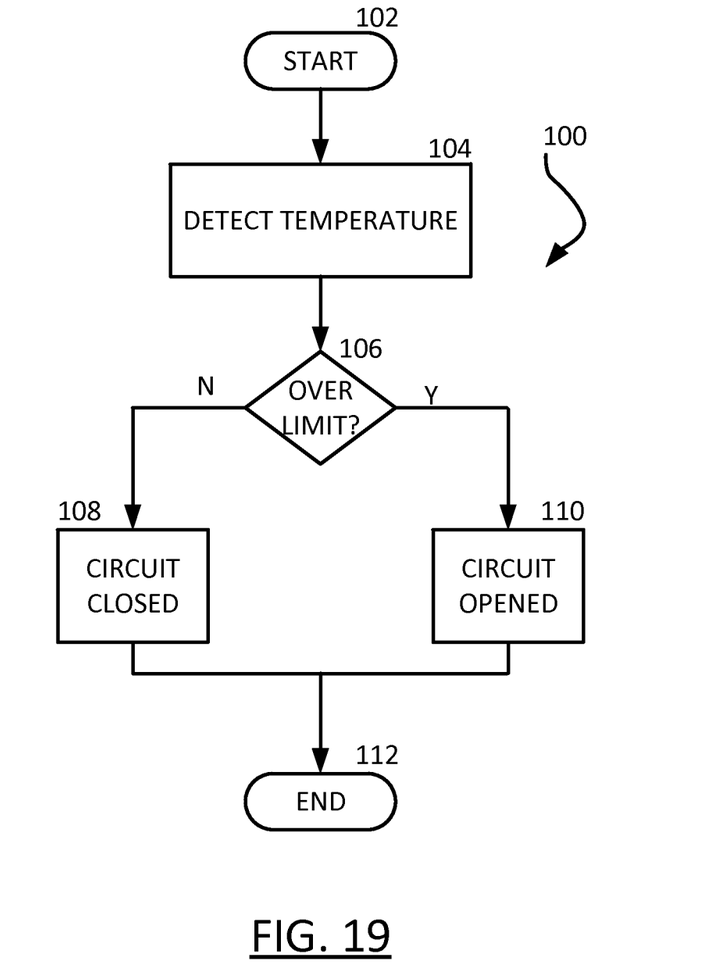
FIG. 19 is a flowchart of the operation of the system, according to an embodiment of the present invention.

Referring now to flowchart 100 of FIG. 19, an illustrative operation of the device will now be discussed. Starting at Block 102, the device may detect the temperature of an environment, such as the plug 30 or cord 40 (Block 104). As discussed above, the temperature may be detected by the thermistor 20 located in the plug 30. The device may then determine whether the temperature is above a limit (Block 106). The limit may be a predefined or variably defined temperature at which the device may desirably operate. If it is determined at Block 106 that the temperature is not above the limit, the electrical circuit may be closed or remain closed and electrical power may be provided to the appliance (Block 108). Conversely, if it is determined at Block 106 that the temperature is not above the limit, the electrical circuit may be opened or remain opened and electrical power may not be provided to the appliance (Block 110). After the circuit has been set or maintained to be opened or closed, the operation may then terminate at Block 112.

Skilled artisans will appreciate that the operation illustrated by flowchart 100 may occur substantially continuously.

Figure 20:
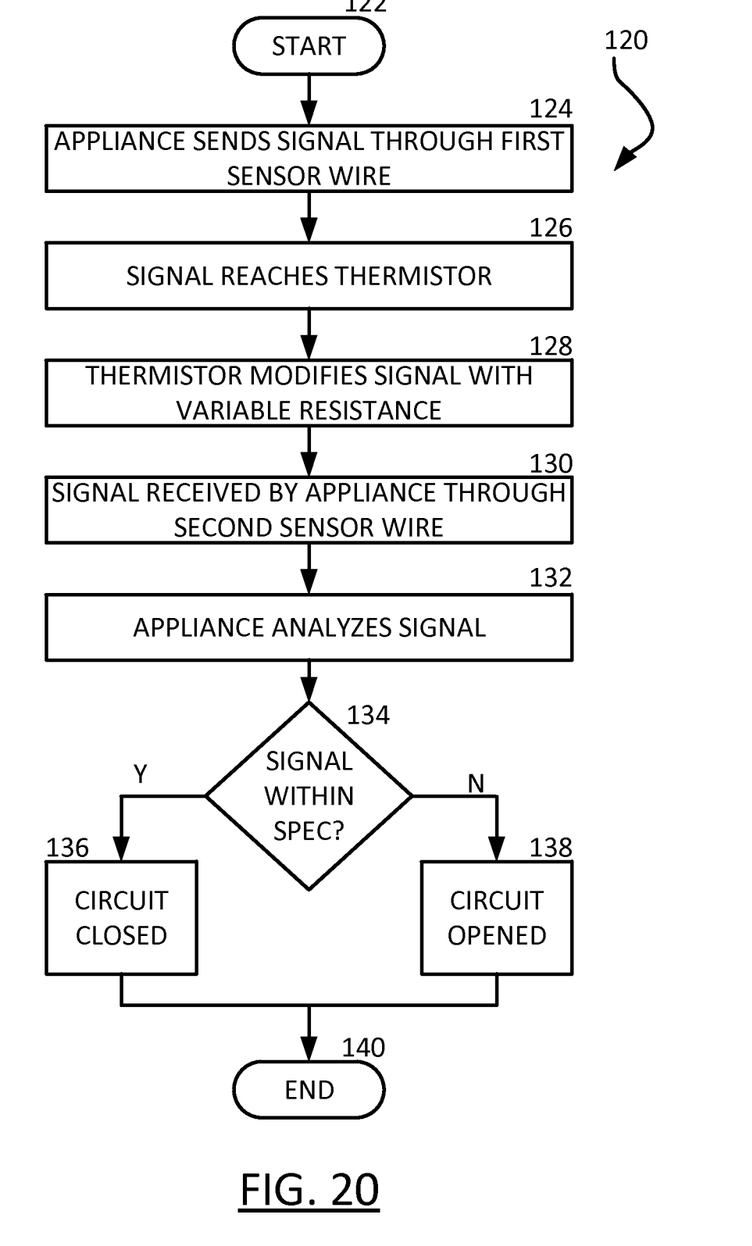
FIG. 20 is a flowchart of using a signal to control operation of the system, according to an embodiment of the present invention.

Referring now to flowchart 120 of FIG. 20, an illustrative operation for sensing a temperature and controlling the power circuit will now be discussed. Starting at Block 122, the appliance may send a signal to the thermistor 20 through the first signal wire 46 (Block 124). This signal may be a constant voltage, a waveform, and/or a signal containing data. The signal may then reach the thermistor 20 (Block 126). The thermistor 20 may modify the signal with a variable resistance (Block 128). As discussed above, the resistance provided by the thermistor 20 may vary with respect to the temperature sensed by the thermistor 20.

After the signal has been varied with a resistance, the signal may be received by the appliance from the thermistor 20 through the second signal wire 48 (Block 130). The appliance may then analyze the signal at Block 132. As discussed above, the analysis may be active or passive, without limitation. Additionally, analysis of the signal may be performed by a sensing device, which may be included in the appliance.

The appliance may determine whether the signal is within an acceptable specification at Block 134. Compliance with the acceptable specification may be analyzed by comparing the signal to a threshold voltage, which may be affected by a threshold resistance of the thermistor 20. If it is determined at Block 134 that the signal is within an acceptable specification, the electrical circuit may be closed or remain closed and electrical power may be provided to the appliance (Block 136). Conversely, if it is determined at Block 134 that the temperature is not within an acceptable specification, the electrical circuit may be opened or remain opened and electrical power may be not provided to the appliance (Block 138). After the circuit has been set or maintained to be opened or closed, the operation may then terminate at Block 140. Skilled artisans will appreciate that the operation illustrated by flowchart 120 may occur substantially continuously.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An overheat-protection system comprising:
   a cord comprising a first end and an opposite end, wherein the cord further comprises:
   transmission wires to transmit electrical power;
   at least two sensor wires to transmit a signal, wherein the signal comprises a waveform that comprises a current or a voltage;
   a plug attached to the opposite end of the cord, the plug comprising two or more prongs included therein to interface with an electrical power source; and
   a thermistor includable in the plug and connected to the at least two sensor wires to vary the signal carried by the at least two sensor wires; and
   an appliance to which the first end of the cord is connected, the appliance comprising:
   a switching device to open or close a power circuit responsive to the signal carried by the at least two sensor wires of the cord, wherein the switching device is connected to the first end of the cord in the appliance; and
   a sensing device for controlling the switching device, wherein the sensing device is connected to the switching device and senses the signal that is varied by the thermistor;
   wherein the switching device and the sensing device are included in the appliance; and
   wherein the appliance analyzes the signal received from the thermistor.

2. The system of claim 1, wherein the thermistor varies the signal responsive to a level of detected heat.

3. The system of claim 2, wherein the thermistor varies the signal by varying a level of resistance of the thermistor responsive to the level of detected heat.

4. The system of claim 3, wherein the switching device opens the power circuit upon detecting the signal is varied to have a lower resistance than a threshold resistance, and wherein the switching device closes the power circuit upon detecting the signal is varied to have a higher resistance than the threshold resistance.

5. The system of claim 1, wherein the thermistor comprises a negative temperature coefficient (NTC) thermistor.

6. The system of claim 1, wherein the thermistor is comprised of a thermal plastic or a ceramic.

7. The system of claim 1, wherein the switching device comprises a relay or a triac.

8. An overheat-protection system comprising:
   a cord comprising a first end and an opposite end, wherein the cord further comprises:
   transmission wires to transmit electrical power;
   at least two sensor wires to transmit a signal, wherein the signal comprises a waveform that comprises a current or a voltage;
   a plug attached to the opposite end of the cord, the plug comprising two or more prongs included therein to interface with an electrical power source;
   a sensor includable in the plug and connected to the at least two sensor wires to vary the signal carried by the at least two sensor wires respective to a level of detected heat; and
   a switching device to open or close a power circuit respective to the signal carried by the at least two sensor wires;
   an appliance to which the first end of the cord is connected, the appliance comprising a sensing device for controlling the switching device, wherein the sensing device is connected to the switching device by the attachment of the sensing device to the first end of the cord, and wherein the sensing device senses the signal that is varied by the sensor; and
   wherein the appliance analyzes the signal received from the thermistor.

9. The system of claim 8, wherein the sensor comprises a thermistor.

10. The system of claim 8, wherein the sensor varies the signal by varying a level of resistance of the sensor responsive to the level of detected heat.

11. The system of claim 10, wherein the switching device opens the power circuit upon detecting the signal is varied to have a lower resistance than a threshold resistance, and wherein the switching device closes the power circuit upon detecting the signal is varied to have a higher resistance than the threshold resistance.

12. The system of claim 8, wherein the sensor comprises a negative temperature coefficient (NTC) thermistor.

13. The system of claim 8, wherein the sensor is comprised of a thermal plastic or a ceramic.

14. The system of claim 8, wherein the switching device comprises a relay or a triac.

15. The device of claim 8, wherein the appliance further comprises the switching device, and wherein the switching device and the sensing device are included in the appliance.

16. A method for protecting from overheating using an overheat-protection system, the overheat-protection system comprising:
   a cord comprising a first end and an opposite end, wherein the cord further comprises:
      transmission wires to transmit electrical power and at least two sensor wires to transmit a signal; and
      a plug attached to the opposite end of the cord, wherein the plug further comprises two or more prongs to interface with an electrical power source, wherein the plug further comprises a thermistor connected to the at least two sensor wires, wherein the thermistor generates the signal;
   a switching device; and
   an appliance to which the first end of the cord is connected, the appliance comprising a sensing device for controlling the switching device;
   wherein the switching device is located in the cord or in the appliance;
   wherein the appliance analyzes the signal received from the thermistor;
   the method comprising the steps of:
   (a) detecting a level of heat using the thermistor, the level of heat being communicable as the signal;
   (b) transmitting the signal via the at least two sensor wires; and
   (c) controlling the power circuit using the switching device to open or close the power circuit responsive to the signal carried by the at least two sensing wires;
   wherein the sensing device senses the signal that is varied by the thermistor;
   wherein the signal is definable by the thermistor varying a level of resistance to the signal respective to the level of detected heat; and
   wherein the signal comprises a waveform that comprises a current or a voltage.

17. The method of claim 16, wherein step (c) further comprises the step of:
   (d) opening the power circuit upon detecting the signal is varied to have a lower resistance than a threshold resistance and closing the power circuit upon detecting the signal is varied to have a higher resistance than the threshold resistance.

18. The method of claim 16, wherein the thermistor comprises a negative temperature coefficient (NTC) thermistor.

19. The method of claim 16, wherein the thermistor is comprised of a thermal plastic or a ceramic.

20. The method of claim 16, wherein the switching device comprises a relay or a triac.

\* \* \* \* \*